United States Patent [19]

Flo

[11] Patent Number: 5,111,609

[45] Date of Patent: May 12, 1992

[54] BAIT MOVING FISHING BOBBER

[76] Inventor: Larry D. Flo, 1020 S. Kansas, Newton, Kans. 67114

[21] Appl. No.: 733,350

[22] Filed: Jul. 22, 1991

[51] Int. Cl.⁵ .............................................. A01K 93/00
[52] U.S. Cl. ...................................................... 43/26.1
[58] Field of Search .................... 43/26.1, 42.35, 42.36, 43/26.2, 43.11, 43.13, 21

[56] References Cited

U.S. PATENT DOCUMENTS

| | | | |
|---|---|---|---|
| 1,251,810 | 1/1918 | Oehler | 43/26.2 |
| 2,281,831 | 5/1942 | Courvelle | 43/26.1 |
| 3,364,613 | 1/1968 | Sewell | 43/43.11 |
| 3,645,030 | 2/1972 | Milburn, Jr. | 43/26.1 |
| 3,758,975 | 9/1973 | Curtis | 43/26.1 |
| 4,378,652 | 4/1983 | Lindgren | 43/26.1 |

FOREIGN PATENT DOCUMENTS

0276439  1/1966  Australia .............. 43/26.1

Primary Examiner—Richard K. Seidel
Assistant Examiner—Jeanne M. Elpel
Attorney, Agent, or Firm—John Wade Carpenter

[57] ABSTRACT

A bait mover fishing bobber having an upper and lower bobber housing secured together. A battery is disposed in the lower bobber housing. The lower bobber housing has a longitudinal opening wherethrough a line passes from a reel secured to a shaft which is rotatably mounted on a support frame mounted in the upper and lower bottom housing. A lever is slidably disposed around the shaft and is in contact with the reel such as to place the reel, upon movement in a certain direction caused by the lever, in and out of engagment with the shaft. The line connects to a fishing line such that as the line is caused to be wound and unwound from the reel, any bait on the end of the fishing line will move up and down.

10 Claims, 8 Drawing Sheets

SECTION A-A
FIG. 18

FIG. 17

VIEW B-B
FIG. 19

BAIT MOVING FISHING BOBBER

FIELD OF THE INVENTION

This invention is related to a fishing bobber or floating device. More specifically, this invention provides a fishing bobber which imparts motion (i.e. up and down motion) to a fishing bait or lure.

DESCRIPTION OF THE PRIOR ART

A patentability investigation was conducted and the following U.S. Pat. Nos. were discovered:

788,047—titled: BAIT MOVING DEVICE, Harry.
1,251,810—titled: SUBMARINE MINNOW, Oehler.
1,850,296—titled: FISHING DEVICE, Vermeulen.
2,281,831—titled: FISHING BOB, Courvelle.
3,645,030—titled: BAIT MOVING FISHING BOBBER, Milburn, Jr.
4,420,900—titled: AUTOMATIC FISHING JIGGER, Nestor.
4,602,451—titled: BAIT ACTIVATOR DEVICE, Perez et al.
4,638,585—titled: MOTORIZED FISHING DEVICE AND METHOD, Korte None of the foregoing prior art U.S. Pat. Nos. teach or suggest the particular fishing bobber of this invention.

SUMMARY OF THE INVENTION

The present invention accomplishes its desired objects by broadly providing a bait moving fishing bobber comprising a hollow upper bobber housing; and generally a hollow lower bobber housing secured to the upper bobber housing. The lower bobber housing has a structure defining a lower recess and a longitudinal opening for allowing the atmosphere to communicate with the inside of the generally hollow lower bobber housing. A support frame is disposed in the upper and lower bobber housing. A shaft is rotatably engaged to the support frame which includes a catch means secured thereto for releasably engaging a reel member. The catch means is preferably a finger bound to the shaft. A reel member is rotatably mounted on the shaft; and a lever member means is slidably mounted on the shaft for movably engaging the reel member to move the reel member into and out of engagement with the catch means on the shaft. The reel member also has a catch means for engaging the catch means of the shaft. The catch means for the reel member is preferably a protruding finger secured to the reel member such as to be capable of being placed in engagement with the finger bound to the shaft. The lever means has a structure defining a lever aperture. A line member is engaged to the reel member and passes through the lever aperture and the longitudinal opening. The line member includes a first knot means for moving the lever member in a first direction and a second knot means for moving the lever member in a second direction which is opposite the first direction. A battery is disposed in the lower recess; and a motor means is coupled to the shaft and is electrically engaged to the battery for receiving power to cause the shaft to rotate.

The present invention further accomplishes its desired objects by broadly providing a bait moving fishing bobber comprising a generally transparent hollow upper bobber housing; and a generally hollow lower bobber housing secured to the generally transparent hollow upper bobber housing. The lower bobber housing has a structure defining a lower opening for allowing the atmosphere to communicate with the inside of the generally hollow lower bobber housing. A support frame is disposed in the upper and lower bobber housing; and a shaft is rotatably engaged to the support frame. The shaft includes a catch means secured thereto for releasably engaging a reel member. A reel member is rotatably mounted on the shaft; and a lever member means is slidably mounted on the shaft for movably engaging the reel member to move the reel member into and out of engagement with the catch means on the shaft. The lever means has a structure defining a lever aperture. A line member is engaged to the reel member and passes through the lever aperture and the lower opening. The line member includes a first knot means for moving the lever member in a first direction and a second knot means for moving the lever member in a second direction opposite the first direction. A solar cell means is disposed in the transparent hollow upper bobber housing for receiving energy from the sun; and a motor means is coupled to the shaft and is electrically engaged to the solar cell means for receiving power to cause the shaft to rotate.

It is therefore an object of the present invention to provide a bait moving fishing bobber.

These, together with the various ancillary objects and features which will become apparent to those skilled in the art as the following description proceeds, are attained by this bait moving fishing bobber, a preferred embodiment being shown with reference to the accompanying drawings, by way of example only, wherein:

DETAILED DESCRIPTION OF THE PREFERRED EMBODIMENT OF THE INVENTION

Figure 1:
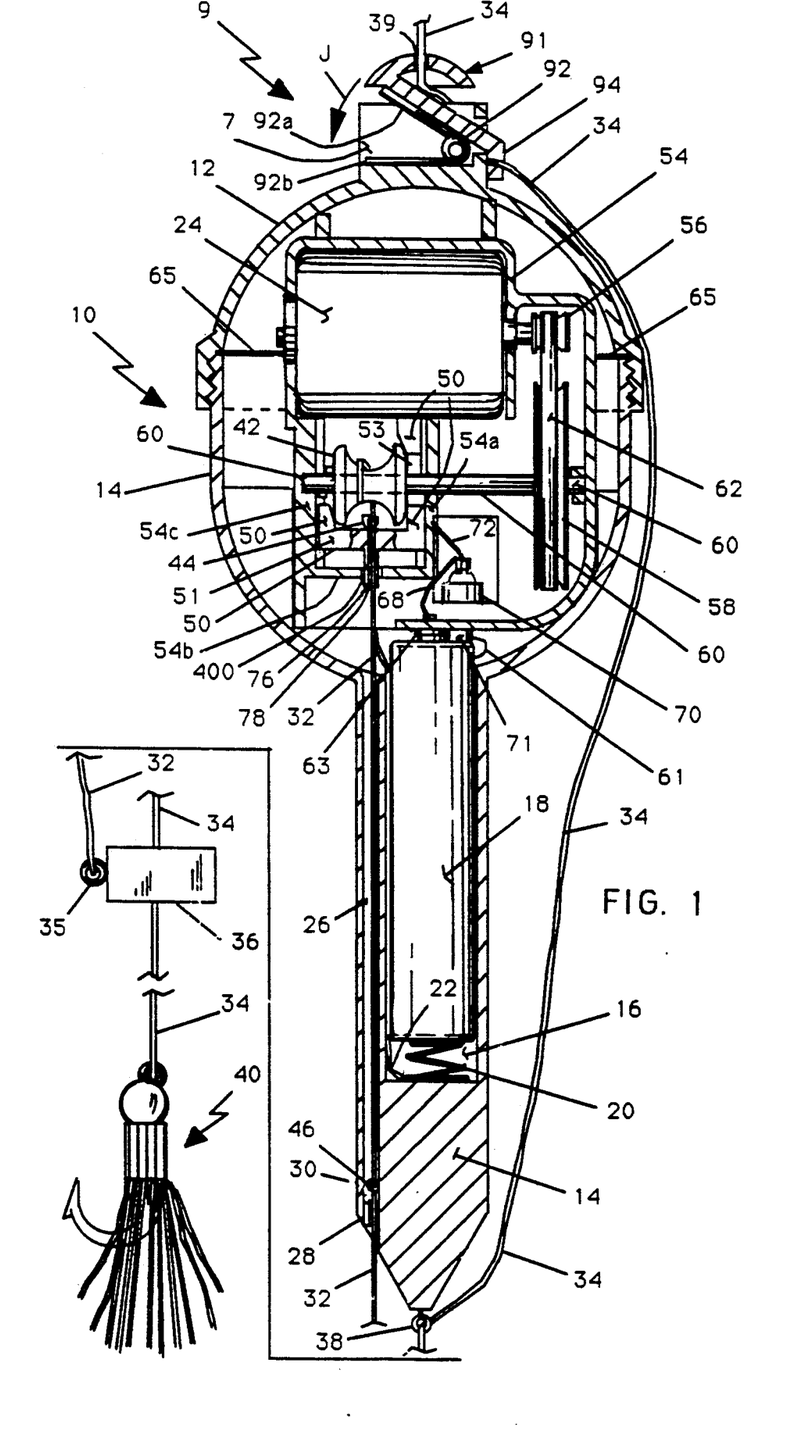
FIG. 1 is a vertical sectional view disclosing the working components of one embodiment of the bait moving fishing bobber.

Referring in detail now to the drawings wherein similar parts of the invention are identified by like reference numerals, there is seen a bait moving fishing bobber, generally illustrated as 10, comprising a upper bobber housing 12 and a lower bobber housing 14 threadably engaged to the upper bobber housing 12. The lower bobber housing 14 has a recess 16 wherein a battery 18 removably lodges. A contact spring 20, which is capable of conducting current, is disposed in the bottom of the recess 16 and has a conductor 22 connected electrically thereto. Conductor 22 also connects to a motor 24. The lower bobber housing 14 has a longitudinal opening 26. A gasket or guide 28 is disposed in the longitudinal opening 26, and has an opening 30 wherethrough a line 32 passes. The line 32 connects to a fishing line 34 via a connection clamp 36 which is best shown in FIG. 1. The clamp 36 has a base 36b and a flexible lid 36a pivotally connected to the base 36b. The flexible lid 36a has a depending flexible lip 36c with a lip recess 36d. The base 36b has a protruding ridge 36r that removably lodges in the lip recess 36d. The clamp 36 closes by pivoting the flexible lid 36a downwardly to flex out the flexible lip 36c and snap the ridge 36r into the recess 36d. Line 34 passes between the base 36b and the lid 36a but is released when the clamp hits or contacts an eyelet (identified as 38 below), causing the flexible lip 36c to break engagement with the base 36a, more particularly with the ridge 36r. An eyelet 35 connects to the base 36b of the clamp 36 and line 32 connects to eyelet 35. When fishing line 34 is being reeled in and when clamp 36 contacts eyelet (identified as 38 below), the fishing line 34 becomes disengaged from the clamp 36 by the lip 36c breaking engagement with the base 36b such that fishing line 34 may be continuously reeled.

Fishing line 34 passes through an eyelet 38 that connects to an outside bottom of the lower bobber housing 14 and through an eyelet clamp means, generally illustrated as 9, connected to an outside top of the upper bobber housing 12. Eyelet clamp means 9 comprises a base 7 with a pair of protruding guide ears 93-93 secured thereto. A lever line clamp 91 is secured to or coupled to an arm 92a of a torsion spring 92 such as to be capable of moving with the arm 92a when the latter is bent or otherwise moved. The torsion spring 92 has another arm 92b which is secured to the base 7. The lever line clamp 91 has an aperture 39 and a clamp lip 94 for engaging the fishing line 34 against the base 7 (see FIGS. 1 and 2). When the arm 92a moves down in direction of the arrow J in FIG. 1, the lever line clamp 91 moves with it, causing the clamp lip 94 to release the fishing line 34. Line 34 passes through the aperture 39 in the lever line clamp 91, behind guide ear 93 (right side for right hand person or left side for left hand person), under clamp lip 94, through eyelet 38 at bottom of bobber, then through connector clamp 36. Connector clamp 36 snaps on line 34 with just enough pressure in order to remain connected to line 34 while line 32 is activating line 34 up and down, thus moving the bait up and down. When fishing line 34 is being reeled in, the bobber is reeled up towards the end of a rod (not shown); and when the end of the rod hits the lever clamp 91, enough pressure is placed on the lever clamp 91 to cause the same to move in direction of the arrow J in FIG. 1, thus releasing the line 34 and the bobber 10 becomes a sliding bobber 10. If connector 36 hasn't disconnected from line 34 from the weight of the fish, it will disconnect when it hits the eyelet 38.

Fishing line 34 connects at one end to a rod/reel (not shown) and, at another end, to a weight/fish hook, generally illustrated as 40. The line 32 connects to a reel 42 and has a pair of knot means 44 and 46 spaced apart for alternatively engaging a lever means, generally illustrated as 50. As will be further explained below, knot means 44 drives or moves the lever 50 in one direction (i.e. downwardly) while knot means 46 drives or moves the lever 50 in another direction (i.e. upwardly) which is the reverse direction that knot means 44 drives or moves the lever 50. The reel 42 has a catch means 43 secured thereto for engaging a catch means (to be identified below) on a shaft (identified as "60" below). The catch means 43 is preferably a protruding finger 43. The catch means 43 may be any other catch or engaging means, such as a reel recess, or the like.

Figure 2:
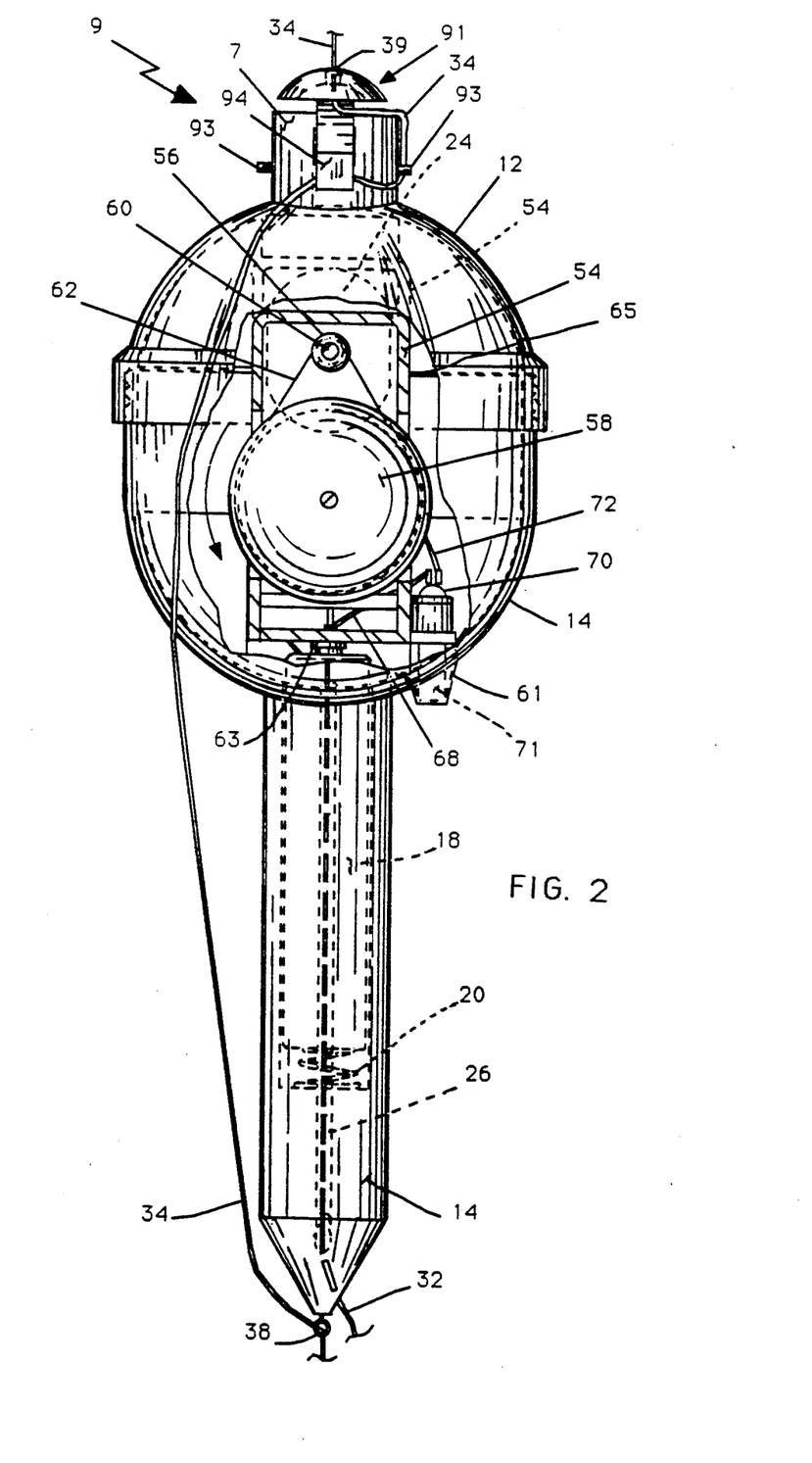
FIG. 2 is a side elevational view of the fishing bobber in FIG. 1 with a section removed disclosing the motor pulley and the driven pulley secured to a shaft.
Figure 3:
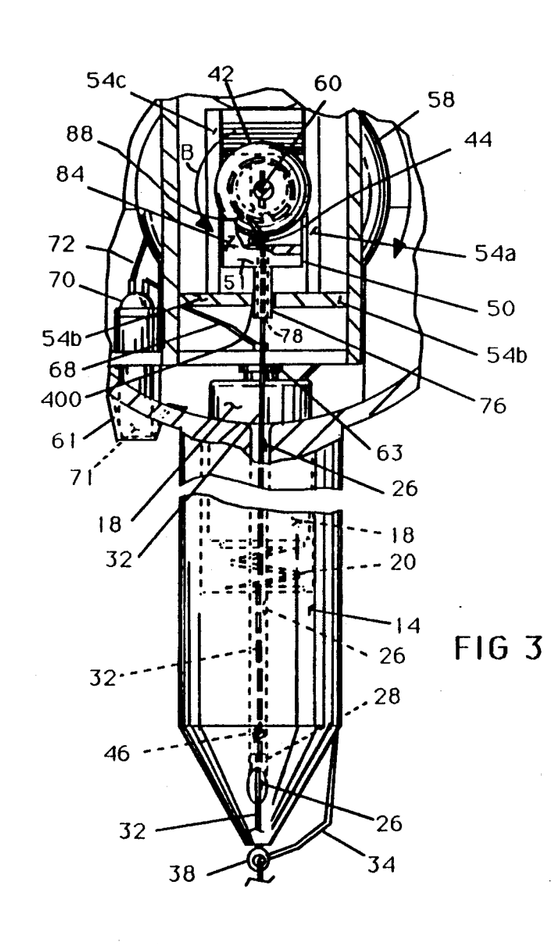
FIG. 3 is an enlarged view of the reel and lever illustrating the direction the reel rotates after the lever has pushed the reel over to release it from engagement with a catch means on the shaft.
Figure 4:
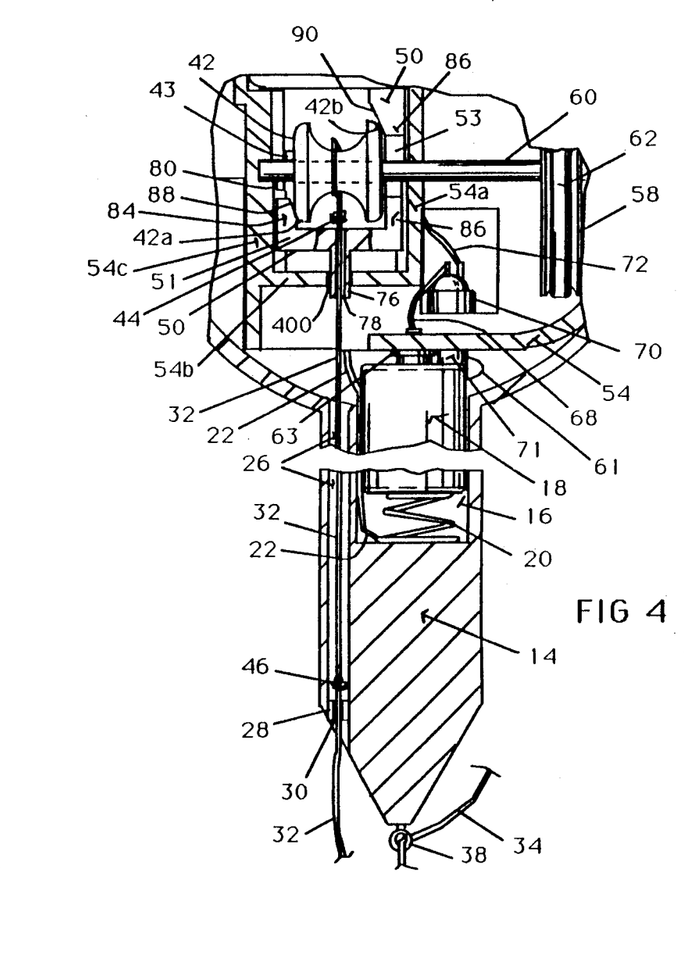
FIG. 4 is an enlarged view of the reel and lever showing the position of the reel, the shaft and the lever after the reel is released from the catch means on the shaft such that when the shaft rotates, the reel does not rotate.

A support frame 54 is disposed in the upper bobber housing 12 and in the lower bobber housing 14 for encasing the motor 24, a motor pulley 56 coupled to the motor 24, and a drive pulley 58 keyed and/or bound to a shaft 60 which is rotatably secured to the support frame 54. An endless belt 62 is entrained over and to the motor pulley 56 and to the drive pulley 58 such that power from the motor 24 can be transferred or imparted to the drive pulley 58 to rotate the latter and the shaft 60. A gasket 65 is disposed around the support frame 54 and is sandwiched between the upper bobber housing 12 and the lower bobber housing 14. A rubber covering 61 is positioned on the bobber housing 14 to cover an actuator 71 of a pressure switch 70. As best shown in FIGS. 2, 3 and 4, the actuator 71 extends through the bobber housing 14 to be covered by rubber cover 61. When the fishing bobber 10 is placed in water, the lower bobber housing 14 extends below the water line such that the water pressure against the covering 61 and the actuator 71 causes the actuator 71 to move and close the pressure switch 70. The battery 18 has positive terminal 63 secured and extending through the support frame 54 and has a conductor 68 electrically engaged thereto. The conductor 68 also electrically engages the pressure switch 70. A conductor 72 is provided for interconnecting the pressure switch 70 with the motor 24.

Figures 7, 10, 14, 16:
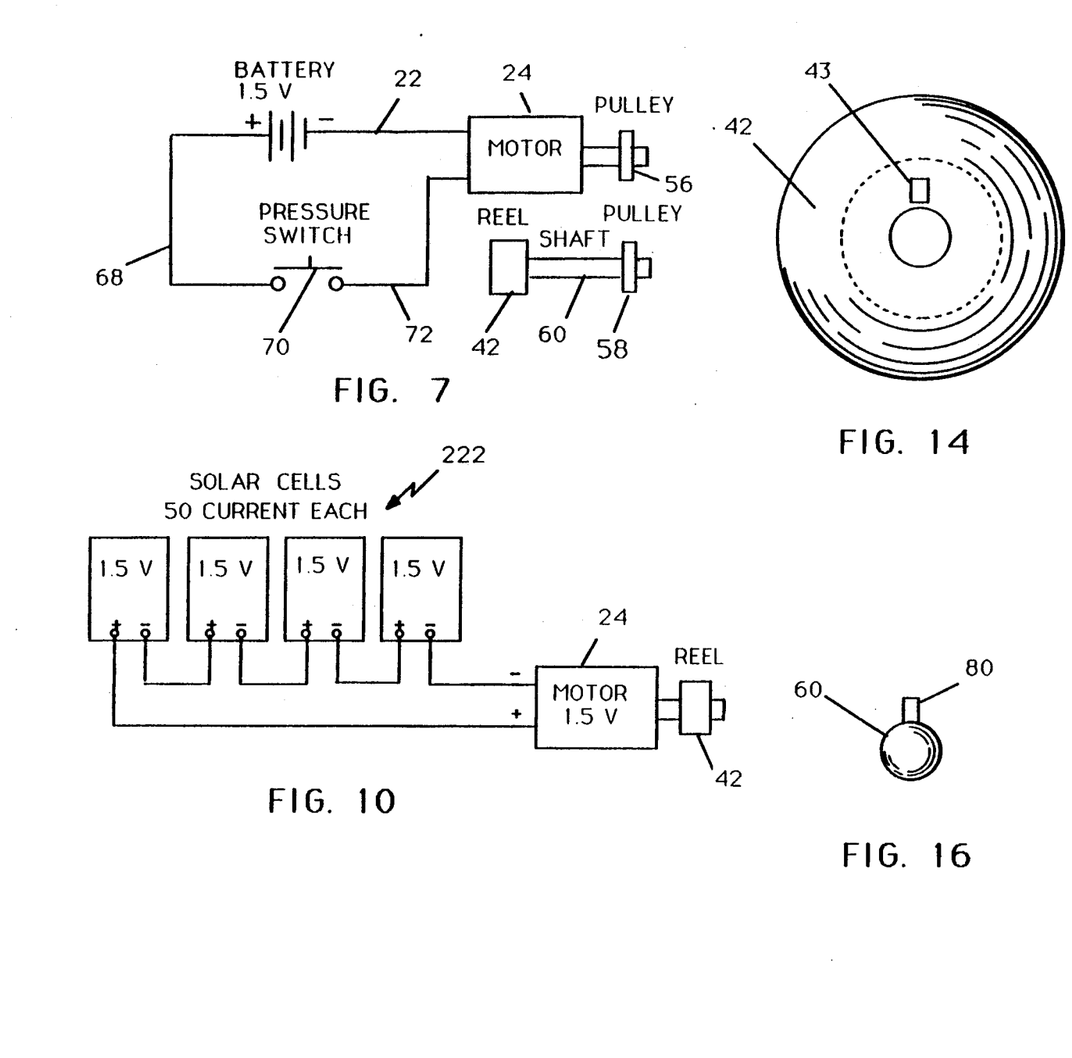
FIG. 7 is a schematic wiring diagram of the battery operated bobber.
FIG. 10 is a schematic wiring diagram of the solar operated bobber.
FIG. 14 is a side elevational view of the reel disclosing the protruding finger thereon.
FIG. 16 is an end elevational view of the shaft disclosing the protruding finger bound thereto.
Figure 8:
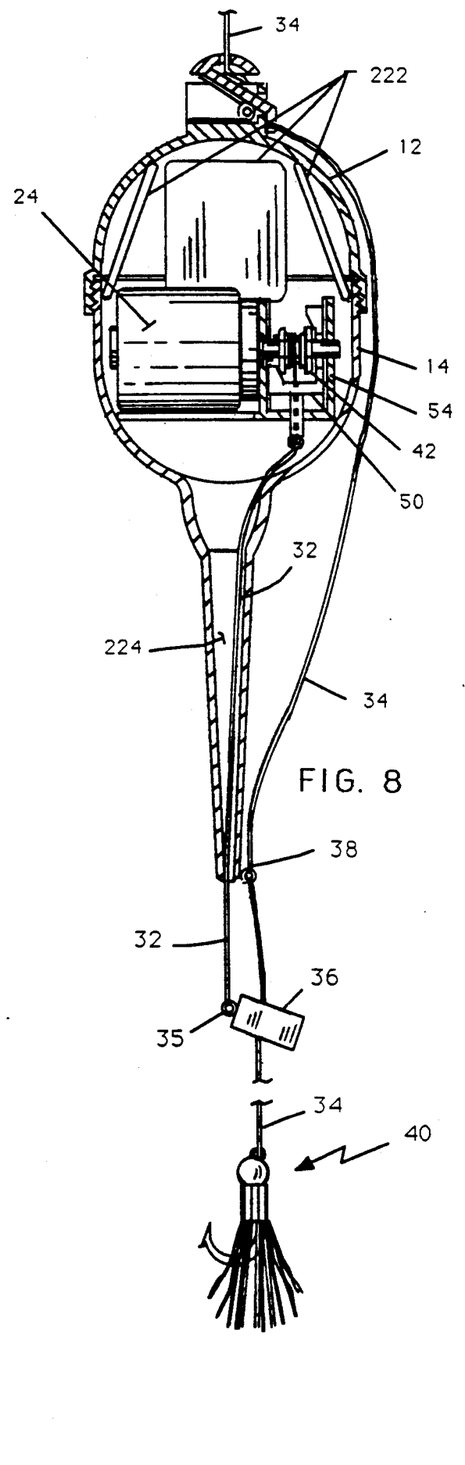
FIG. 8 is a sectional assembly view of the solar operated bobber.
Figure 9:
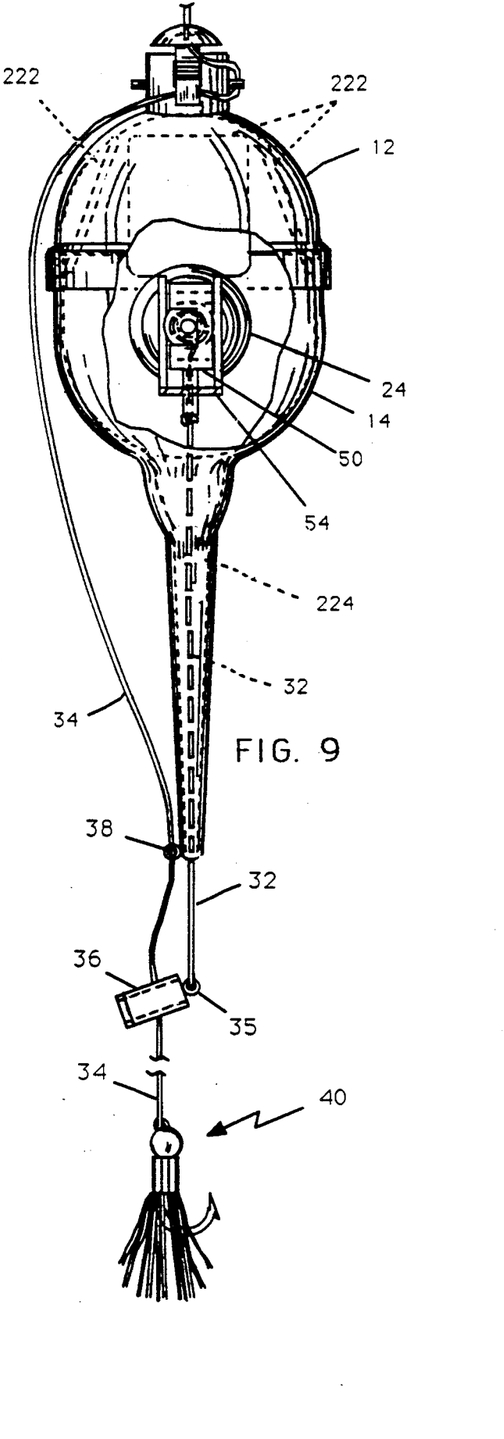
FIG. 9 is a side elevational view of the solar bobber.
Figure 11:
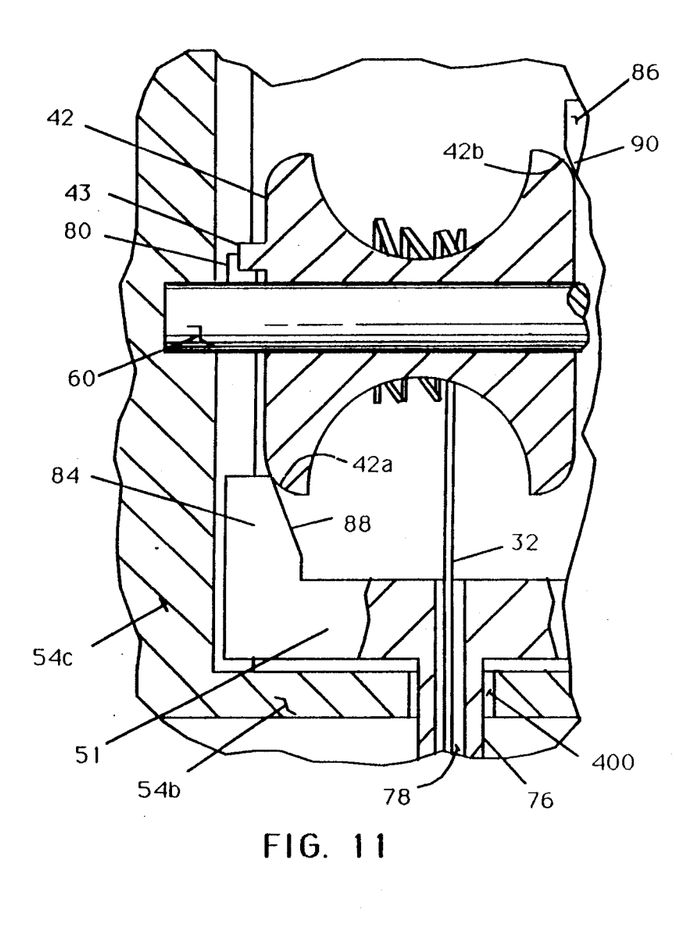
FIG. 11 is a partial enlarged side elevational view of the reel having a protruding finger bound thereto and engaged to a protruding finger bound to the shaft such that as the shaft is rotated by the motor, the reel moves and rotates.
Figure 12:
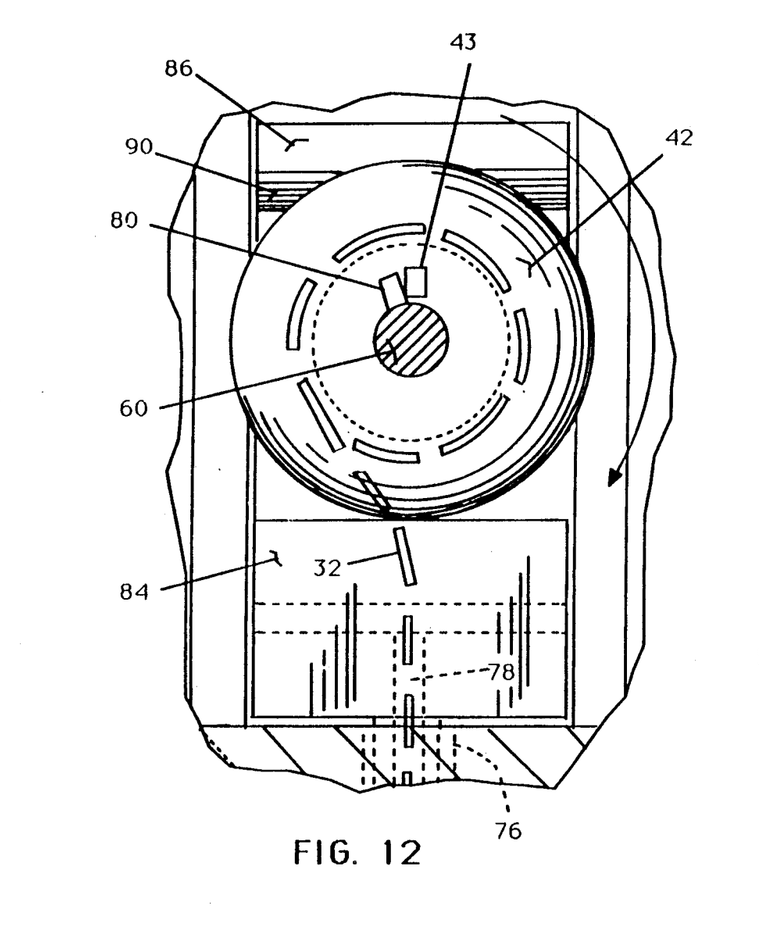
FIG. 12 is a side elevational view of the reel and shaft assembly of FIG. 11.
Figure 13:
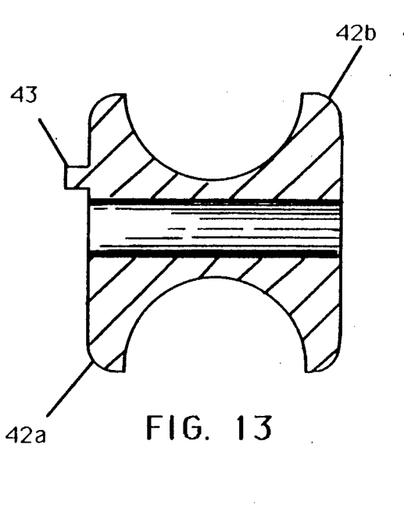
FIG. 13 is a vertical sectional view of the reel disclosing the protruding finger thereon.
Figure 15:
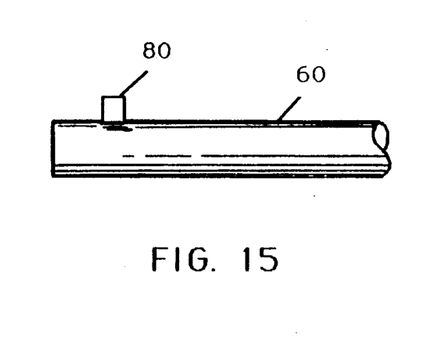
FIG. 15 is a partial side elevational view of the shaft illustrating a protruding finger bound thereto.
Figure 17:
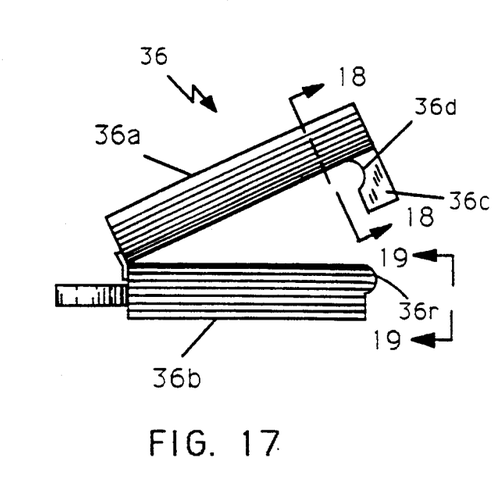
FIG. 17 is a side elevational of the connection clamp.
Figure 18:
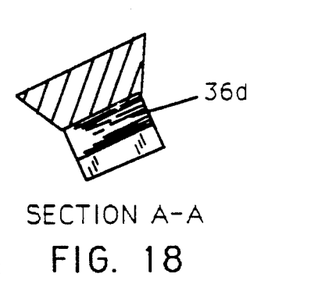
FIG. 18 is a vertical sectional view taken in direction of the arrow and along the plane of line 18-18 in FIG. 17.
Figure 19:
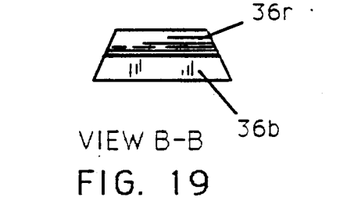
FIG. 19 is a front elevational view taken in direction of the arrow and along the plane of line 19-19 in FIG. 17.
Figure 20:
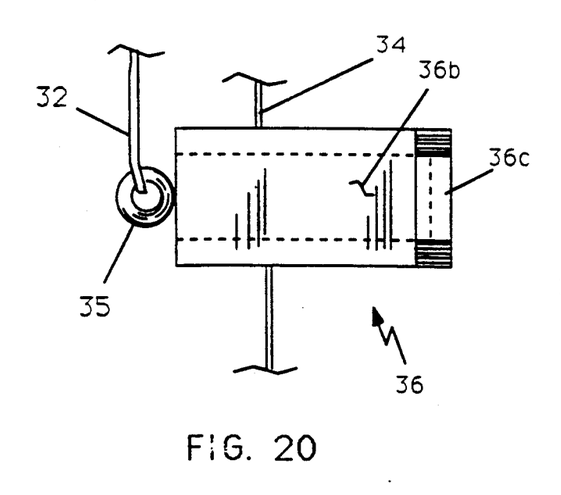
FIG. 20 is a bottom plan view of the connection clamp in FIG. 17.
Figure 21:
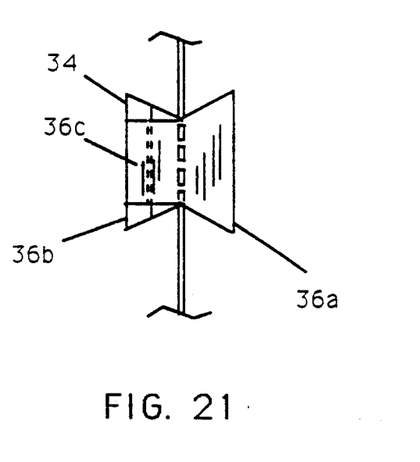
FIG. 21 is a front elevational view of the connection clamp in FIG. 20.

In the embodiment of the invention depicted in FIGS. 8, 9 and 10, the battery 18 is replaced with solar cells, generally illustrated as 222, and electrically engaged to motor 24. The upper bobber housing 12 is transparent such that the solar cells 222 can receive solar energy from the sun and transmit electrical energy to the motor 24. In this embodiment of the invention, recess 16 is removed from the lower bobber housing 14 and the entire structure of the lower bobber housing 14 is formed with a centrally disposed longitudinal bore 224 wherethrough the line 32 passes. This embodiment of the invention may or may not have a pressure switch 70.

The shaft 60 has a catch means 80 bound thereto for engaging the catch means 43 of the reel 42 when moved by the lever means 50. The catch means 80 may be any suitable catch or engaging means for engaging the reel 42, more specifically the protruding finger 43 of the reel 42. Preferably, the catch means 80 is a protruding finger 80 for engaging the protruding finger 43 of the reel 42 when the latter is moved by the lever means 50. As previously indicated, the reel 42 may have a reel recess (not shown) for engaging the protruding finger 80 of the shaft 60, such as (by way of example) having the finger 80 passing into the reel recess (not shown).

The lever means 50 is generally an L-shaped member having an opening 53 that is slidably disposed on the shaft 60 and between compartment walls 54a, 54b and 54c of the support frame 54. Shaft 60 rotatably passes through opening 53. Lever means 50 has a base 51 and tongue 76 depending downwardly therefrom to slidably pass through an aperture 400 in the compartment wall 54b. Tongue 76 has a tongue bore 78 extending therethrough such that the line 32 can pass from the reel 42. The opening of the tongue bore 78 is smaller than the knot means 44 and 46 so that the knot means 44 and 46 can not pass thereinto. By the knot means 44 and 46 being larger in diameter than the opening of the tongue bore 78, the knot means 44 and 46 are able to drive the lever means 50 either upwardly or downwardly between the compartment walls 54a and 54c as will be further explained below.

Figure 5:
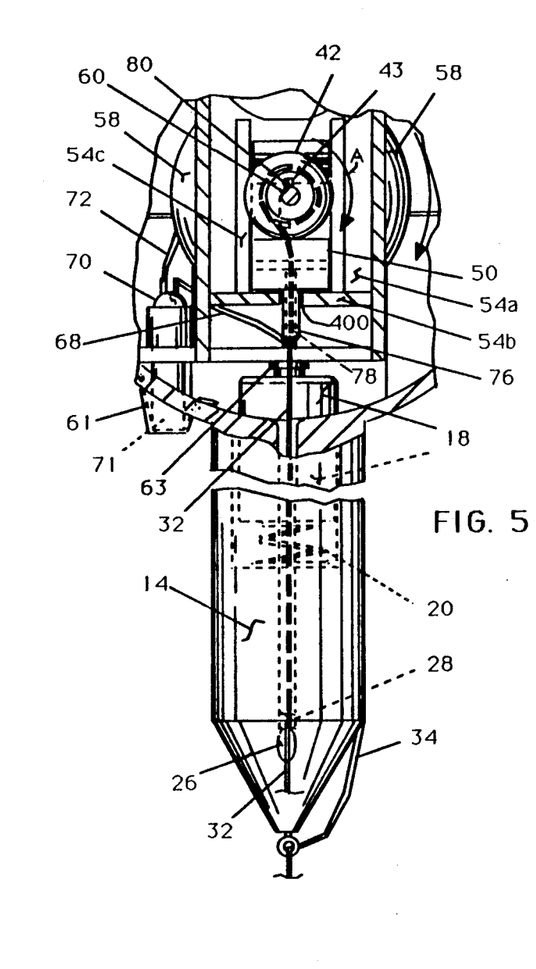
FIG. 5 is an enlarged view of the reel and lever illustrating the direction the reel rotates when it is engaged with the catch means on the shaft.
Figure 6:
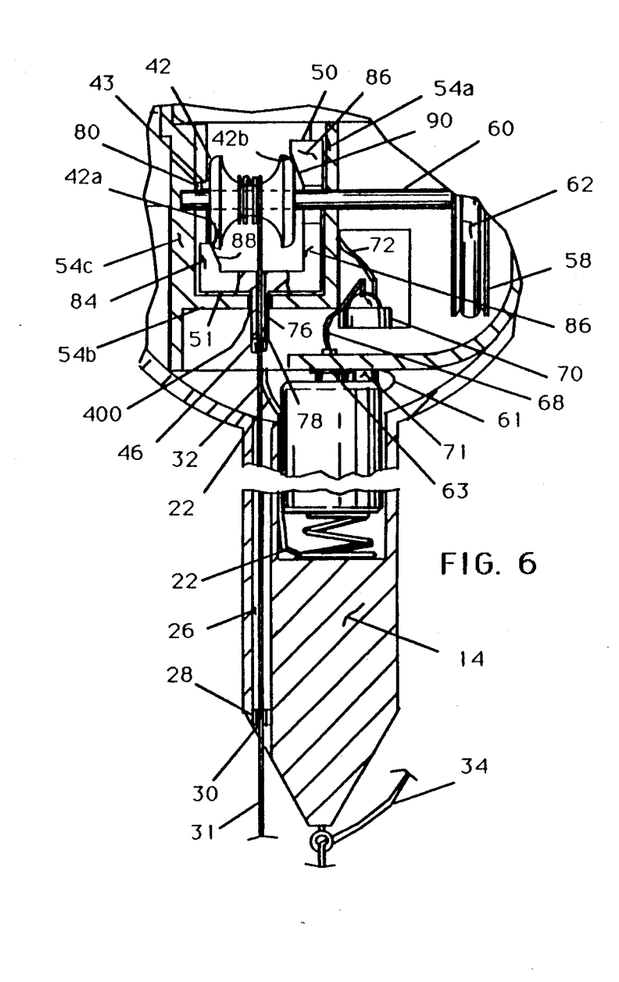
FIG. 6 is an enlarged view of the reel and lever showing the position of the reel, the shaft and the lever after the reel has been engaged to the catch means on the shaft such that when the shaft rotates, the reel rotates with the shaft.

The lever means 50 has an upstanding lip 84 bound to the base 51 and an upstanding back 86 also bound to the base 51. Opening 53 passes through the back 86. The lip 84 has a beveled or slanted surface 88 for releasably engaging a lower part 42a of the reel 42. The back 86 has a beveled or slanted surface 90 for releasably engaging an upper part 42b of the reel 42. As best shown in FIG. 4, slanted surfaces 88 and 90 are generally opposed to each other with the reel 42 generally disposed between the two slanted surfaces 88 and 90. When the finger 43 of the reel 42 is not engaged to the finger 80 of the shaft 60 and because line 32 connects to fishing line 34 at connection point 36 in accordance with the previously mentioned manner and procedure, the line 32 is being pulled downwardly by the weight of weight/fish hook assembly 40 on the end of fishing line 34. When the reel 42 is not engaged to the shaft 60, more specifically when the finger 43 of the reel 42 is not engaged to the finger 80 on the shaft 60, the shaft 60 is being rotated by the motor 24 in direction of the arrow A in FIG. 5, but the reel 42 is "free-wheeling" or rotating in direction of the arrow B in FIG. 3 due to a descending weight/fish hook assembly 40. As previously indicated, line 32 connects to fishing line 34 at connection point 36. The reel 42 continues to free-wheel and/or rotate in direction of the arrow B in FIG. 3 and the weight/fish hook assembly 40 continues to descend until the knot means 44 contacts the base 51 of the lever means 50. Upon contact, the knot means 44 will not pass into or through tongue bore 78, and the descending weight/fish hook assembly 40 forces the base 51 of the lever means 50 downwardly causing the slanted surface 90 to engage slidably the upper part 42b of the reel 42. As the pull on the lodged knot means 44 continues by the descending weight/fish hook assembly 40 and base 51 continues to travels downwardly, the descending slanted surface 90 causes the reel 42 to move towards the left in FIG. 5. As further best shown in FIG. 4, the slanted surface 88 of lip 84 is slanted such that as lip 84 travels downwardly with the descending base 51, the reel 42 is free to move to the left. The reel 42 continues to move to the left until the disposition pictured in FIG. 6 is reached. In this disposition the finger 43 on the reel 42 is moved over far enough such that the rotating finger 80 on rotating shaft 60 engages the finger 43 on the reel 42 and causes reel 42 to reverse its rotation in direction of arrow B in FIG. 3 and start rotating in direction of arrow A in FIG. 5. As the reel 42 rotates in direction of arrow A in FIG. 5, line 32 is being reeled-up on reel 42, and as line 32 is being reeled-up it pulls upwardly on fishing line 34, causing the weight/fish hook assembly 40 to rise and move or go upwardly. The reel 42 continues to rotate in direction of arrow A in FIG. 5 until knot means 46 engages the bottom of tongue 76. As previously mentioned, the knot means 46 is too large to enter the tongue bore 78. The reel 42 revolves with enough rotating force to commence drawing the tongue 76 and the base 51 of the lever means 50 upwardly. As the base 51 rises, the slanted surface 88 on lip 84 also rises to start moving the reel 42 to the right in FIG. 6. Continuing to reference FIG. 6, as lip 84 rises, the back 86 also rises; and the surface of the slanted surface 90 is slanted such that as the back 86 rises, the upper part 42b is free to travel downwardly on the slanted surface 90 and the entire reel 42 moves to the right. The reel 42 continues to move to the right as the lever means 50 is being driven upwardly until the finger 43 of the reel 42 has moved far enough to the right and it is no longer engaged to finger 80 on the shaft 60 and the disposition pictured in FIG. 4 is reached. The instant that finger 43 of the reel 42 becomes disengaged from a revolving finger 80 on shaft 60, the reel 42 stops rotating in direction of the arrow A in FIG. 5 and the weight/fish hook assembly 40 stops rising and starts to descend. A descending weight/fish hook assembly 40 causes the line 32 to descend and start rotating and/or "free-wheeling" the reel 42 in direction of the arrow B in FIG. 3. As the reel 42 rotates in direction of the arrow B in FIG. 3 and line 32 descends, line 32 is being unreeled off of or from reel 42. The descending weight/fish hook assembly 40 causes line 32 to descend and unreel off of reel 42 until knot means 44 again becomes lodged against the base 51 of the lever means 50. When the knot means 44 contacts the base 51 of the lever means 50, the force from a descending weight/fish hook assembly 40 causes the base 51 and its associated lip 51 and back 86 to start a downward track and the entire process is repeated. The lever means 50 is constructed of material (e.g. plastic) sufficiently light enough such that when the reel 42 and the lever means 50 is in the disposition of FIG. 4, the weight of the lever means 50 will not drive the reel 42 to the left until the knot means 44 contacts the base 51 and the weight of a downwardly traveling weight/fish hook assembly 40 is employed to move the base 5i and the associated lip 84 and back 86 of the lever means 50 downwardly. Thus, by operation of the present invention there is provided a bait moving fishing bobber 10 which moves a weight/fish hook assembly 40 up and down intermittently.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A bait moving fishing bobber comprising a hollow upper bobber housing; and generally a hollow lower bobber housing secured to said upper bobber housing, said lower bobber housing having a structure defining a lower recess and a longitudinal opening for allowing the atmosphere to communicate with the inside of said generally hollow lower bobber housing; a support frame disposed in said upper and lower bobber housing; a shaft rotatably engaged to said support frame, said shaft including a catch means secured thereto for releasably engaging a reel member; a reel member rotatably mounted on said shaft; a lever member means slidably mounted on said shaft for movably engaging said reel member to move said reel member into and out of engagement with said catch means on said shaft, said lever means having a structure defining a lever aperture; a line member engaged to said reel member and passing through said lever aperture and said longitudinal opening, said line member including a first means for moving the lever member in a first direction and a second means for moving the lever member in a second direction opposite the first direction; a battery is disposed in said lower recess; and a motor means coupled to said shaft and electrically engaged to said battery for receiving power to cause said shaft the rotate.

2. The bail moving fishing bobber of claim 1 wherein said lever member has a pair of opposed slanted surfaces.

3. The bait moving fishing bobber of claim 1 wherein said reel member has a reel member catch means for engaging the catch means on the shaft.

4. The bait moving fishing bobber of claim 1 additionally comprising an eyelet clamp means secured to the upper bobber housing.

5. The bait moving fishing bobber of claim 1 wherein said first means for moving the lever member in a first direction is a knot in said line member and said second means for moving the lever member in a second direction is a knot in said line member.

6. A bait moving fishing bobber comprising a generally transparent hollow upper bobber housing; a generally hollow lower bobber housing secured to said generally transparent hollow upper bobber housing, said lower bobber housing having a structure defining a lower opening for allowing the atmosphere to communicate with the inside of said generally hollow lower bobber housing; a support frame disposed in said upper and lower bobber housing; a shaft rotatably engaged to said support frame, said shaft including a catch means secured thereto for releasably engaging a reel member; a reel member is rotatably mounted on said shaft; a lever member means slidably mounted on said shaft for movably engaging said reel member to move said reel member into and out of engagement with said catch means on said shaft, said lever means having a structure defining a lever aperture; a line member is engaged to said reel member and passing through said lever aperture and said lower opening, said line member including a first means for moving the lever member in a first direction and a second means for moving the lever member in a second direction opposite the first direction; solar cell means disposed in said transparent hollow upper bobber housing for receiving energy from the sun; and a motor means coupled to said shaft and electrically engaged to said solar cell means for receiving power to cause said shaft to rotate.

7. The bait moving fishing bobber of claim 6 wherein said lever member has a pair of opposed slanted surfaces.

8. The bait moving fishing bobber of claim 6 wherein said reel member has a reel member catch means for engaging the catch means on the shaft.

9. The bait moving fishing bobber of claim 6 additionally comprising an eyelet clamp means secured to the upper bobber housing.

10. The bait moving fishing bobber of claim 6 wherein said first means for moving the lever member in a first direction is a knot in said line member and said second means for moving a lever member in a second direction is a knot in said line member.

* * * * *